(12) United States Patent
Nagashima et al.

(10) Patent No.: US 7,807,939 B2
(45) Date of Patent: Oct. 5, 2010

(54) LASER WELDING METHOD AND LASER WELDING APPARATUS

(75) Inventors: Takahiro Nagashima, Chiba-ken (JP); Junpei Kase, Chiba-ken (JP)

(73) Assignee: Miyachi Corporation, Chiba-ken (JP)

( * ) Notice: Subject to any disclaimer, the term of this patent is extended or adjusted under 35 U.S.C. 154(b) by 1341 days.

(21) Appl. No.: 11/292,070

(22) Filed: Dec. 2, 2005

(65) Prior Publication Data

US 2006/0237402 A1 Oct. 26, 2006

(30) Foreign Application Priority Data

Apr. 22, 2005 (JP) .............................. 2005-125329

(51) Int. Cl.
*B23K 26/20* (2006.01)
(52) U.S. Cl. .............................. 219/121.64; 219/121.76
(58) Field of Classification Search ................................
219/121.61–121.72, 121.77, 121.85
See application file for complete search history.

(56) References Cited

U.S. PATENT DOCUMENTS

| | | | | |
|---|---|---|---|---|
| 4,793,694 A * | 12/1988 | Liu | ............................ | 359/494 |
| 5,307,369 A * | 4/1994 | Kimberlin | .................... | 372/108 |
| 5,490,912 A * | 2/1996 | Warner et al. | .......... | 204/298.02 |
| 5,498,851 A * | 3/1996 | Hayashi et al. | .......... | 219/121.7 |
| 6,324,195 B1 * | 11/2001 | Suzuki et al. | .................. | 372/25 |
| 6,368,406 B1 * | 4/2002 | Deevi et al. | .................. | 117/108 |
| 6,563,083 B2 * | 5/2003 | Behr et al. | ............. | 219/121.78 |
| 6,580,055 B2 * | 6/2003 | Iso | ........................... | 219/121.7 |
| 6,700,905 B1 * | 3/2004 | Karasawa et al. | ............. | 372/21 |
| 6,710,289 B2 * | 3/2004 | Iso | ........................... | 219/121.7 |
| 7,065,105 B2 * | 6/2006 | Ehlers et al. | .................... | 372/9 |
| 7,125,761 B2 * | 10/2006 | Tanaka | ........................ | 438/166 |
| 7,136,402 B1 * | 11/2006 | Ohtsuki | ........................ | 372/22 |
| 7,345,256 B2 * | 3/2008 | Chen et al. | ............... | 219/121.6 |
| 7,551,537 B2 * | 6/2009 | Tamada | ...................... | 369/100 |
| 2003/0032221 A1 * | 2/2003 | Kasahara et al. | ............ | 438/149 |
| 2006/0198402 A1 * | 9/2006 | Hodgson et al. | ............... | 372/22 |

FOREIGN PATENT DOCUMENTS

JP 363028088 A * 2/1988
JP 02002028795 A * 1/2002

* cited by examiner

*Primary Examiner*—Samuel M Heinrich
(74) *Attorney, Agent, or Firm*—Wenderoth, Lind & Ponack, L.L.P.

(57) ABSTRACT

A YAG pulse laser oscillator 10 oscillates/outputs pulse width-variable YAG fundamental pulse laser light LB, and a YAG pulse laser oscillator 12 oscillates/outputs pulse width-variable YAG second harmonic pulse laser light SHG. An emission unit 20 superposes the pulse laser light LB and the pulse laser light SHG on the same optical axis and focuses, and irradiates a welding point K on welding pieces ($W_1$ and $W_2$) with, the pulse laser light LB and the pulse laser light SHG. A control unit 18 controls the laser oscillation operation of the laser oscillators 10 and 12 so that the point in time when the laser output of the YAG second harmonic pulse laser light SHG reaches its peak is slightly earlier than the point in time when the laser output of the YAG fundamental pulse laser light LB reaches its peak.

8 Claims, 9 Drawing Sheets

LASER WELDING METHOD AND LASER WELDING APPARATUS

BACKGROUND OF THE INVENTION

1. Field of the Invention

The present invention relates to laser welding technology that welds metal using lasers, and in particular to a laser welding method and apparatus that superpose, and irradiate welding pieces with, laser beams of two wavelengths.

2. Description of the Related Art

In recent years, lasers have been used in the manufacturing industry, and particularly in the fields of welding, cutting, and surface treatment. The importance of laser welding technology is actually increasing more and more because high-precision and high-speed processing can be realized, the thermal strain on the work pieces is small, and high-speed automatization is possible. At present, the solid-state laser most often used in laser welding is a YAG laser that generates a light beam with a wavelength of about 1 µm. A YAG laser is a laser where YAG ($Y_3Al_5O_{12}$) crystal serving as the mother material is doped with rare-earth active ions ($Nd^{3+}$, $Yb^{3+}$, etc.), and the fundamental wavelength of the representative Nd:YAG laser is 1064 nm. A YAG laser is capable of continuous oscillation and giant pulse oscillation by Q-switching, and can generate laser light of a long pulse having a pulse width of 100 µs (typically 1 to 10 ms) or greater.

In laser welding, the optical coupling characteristic of the laser light with the welding materials is important. If the optical coupling characteristic is not good, the reflectance is high, the absorption efficiency of the laser energy is low, and it is difficult to obtain a good welding connection. In this respect, the optical coupling characteristic of fundamental wavelength (e.g., 1064 nm) YAG laser light is not good with respect to copper and gold. It is known that second harmonic (532 nm) YAG laser light has rather higher optical coupling characteristic with respect to these metals. As a laser welding method effective for welding copper and gold, the present applicant has disclosed in Japanese Patent Application Publication (JP-A) No. 2002-28795 a laser welding method that superposes, and irradiates welding materials with, YAG fundamental pulse laser light and YAG second harmonic Q-switched laser light.

However, this conventional laser welding method has problems in that the keyhole and penetration depth are still insufficient and the applicability of the method to thick plate welding (particularly copper thick plate welding) is difficult because the optical coupling time of the YAG second harmonic (532 nm) Q-switched laser light applied as an intermittently repeated pulse with the welding materials is short.

SUMMARY OF THE INVENTION

The present invention was conceived in view of the aforementioned problems in the prior art, and it is an object thereof to provide a laser welding method and a laser welding apparatus that realize deep penetration welding in a method that superposes the two wavelengths of a YAG fundamental and a YAG harmonic, and which improve reproducibility and quality.

In order to achieve the above object, according to an aspect of the present invention there is provided a method of superposing, and irradiating a welding zone with, YAG fundamental pulse laser light having a variable pulse width and YAG harmonic pulse laser light having a variable pulse width, to thereby weld the welding pieces with the energy of both the YAG fundamental pulse laser light and the YAG harmonic pulse laser light, the method comprising superposing both pulse laser lights at a time difference so that the laser output of the YAG harmonic pulse laser light reaches its peak before the laser output of the YAG fundamental pulse laser light reaches its peak.

To attain the above object, according to another aspect of the present invention there is provided a laser welding apparatus comprising a first laser oscillation unit that generates YAG fundamental pulse laser light by pulse width variation; a second laser oscillation unit that generates YAG harmonic pulse laser light by pulse width variation; an emission unit that superposes, and irradiates a desired welding zone with, the YAG fundamental pulse laser light and the YAG harmonic pulse laser light; and a control unit that controls the laser oscillation operation between the first and second laser oscillation units so that the laser output of the YAG harmonic pulse laser light reaches its peak before the laser output of the YAG fundamental pulse laser light reaches its peak.

In this configuration, the YAG harmonic is applied as the pulse-width variable pulse laser light. Thus, the time of interaction with the welding pieces is significantly longer than Q-switched pulse laser light, and deep penetration can be realized due to the multiplier effect with the YAG fundamental. Moreover, because the laser output of the YAG harmonic pulse laser light reaches its peak before (preferably 0.05 ms to 0.3 ms before) the laser output of the YAG fundamental pulse laser light reaches its peak, keyhole formation is smoothly started in the vicinity of the welding point, whereby constant penetration with good reproducibility is obtained.

The present invention is also characterized in that, in a laser welding method that superposes, and irradiates a welding zone with, YAG fundamental pulse laser light and YAG harmonic pulse laser light, the fall of the YAG fundamental pulse laser light is controlled to a downslope waveform. According to this downslope waveform control, the irradiation energy of the pulse laser is gradually reduced, whereby the melted material gradually spreads inside the keyhole, and a nugget surface (welded exterior) without humping is obtained. In a preferred embodiment, the fall time of the YAG fundamental pulse laser light is selected to be within the range of 20% to 50% with respect to the duration of the peak of the YAG fundamental pulse laser light.

In a preferred embodiment of the laser welding apparatus of the present invention, a first optical fiber that transmits the YAG fundamental pulse laser light from the first laser oscillator to the laser emission unit and a second optical fiber that transmits the YAG harmonic pulse laser light from the second laser oscillator to the laser emission unit are used, and the first optical fiber for the YAG fundamental has a core diameter that is slightly larger than (preferably 1.3 times to 2 times) the core diameter of the second optical fiber for the YAG harmonic. According to this configuration, the irradiation diameter of the YAG fundamental pulse laser light can be made slightly larger than the irradiation diameter of the YAG harmonic pulse laser light, the melted portion around the keyhole can be stabilized during laser irradiation, and the nugget (particularly the edge portions) can be made into a smooth surface after solidification.

According to the laser welding method and laser welding apparatus of the present invention, due to the above configuration and action, deep penetration welding in a method that superposes the two wavelengths of a YAG fundamental and a YAG harmonic can be realized, and reproducibility and quality can also be improved.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

A preferred embodiment of the present invention will be described below with reference to the attached drawings.

Figure 1:
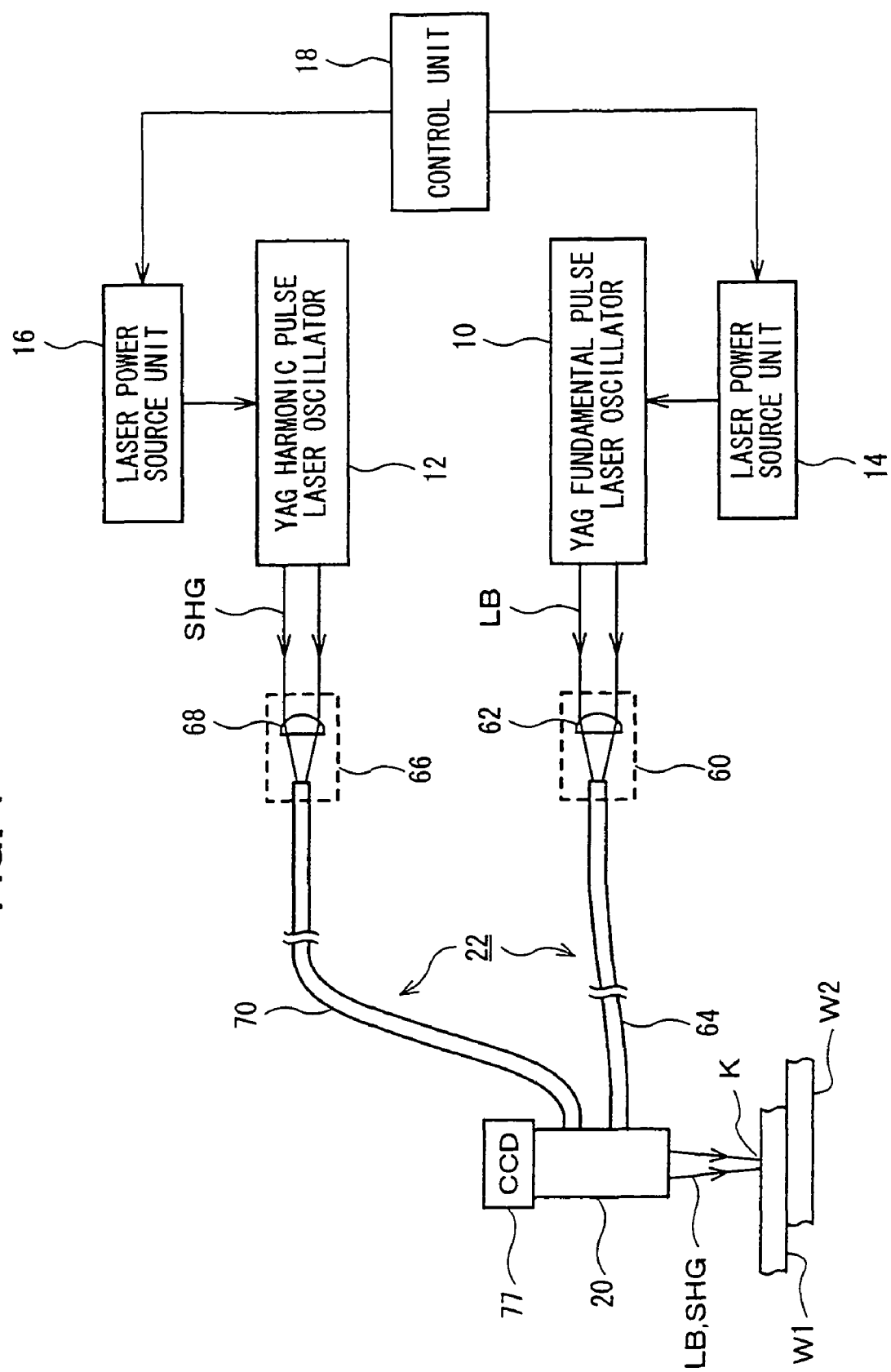
FIG. 1 is a diagram showing the configuration of a laser welding apparatus that superposes two wavelengths according to an embodiment of the present invention.

FIG. 1 shows the configuration of a laser welding apparatus that superposes two wavelengths according to the embodiment of the present invention. The laser welding apparatus includes: two YAG pulse laser oscillators 10 and 12; laser power source units 14 and 16 that are electrically connected to the pulse laser oscillators 10 and 12, respectively; a control unit 18 that controls the laser oscillation operation of both the pulse laser oscillators 10 and 12 through the laser power source units 14 and 16; an emission unit 20 that superposes two wavelengths and is disposed in a desired processing place; and an optical fiber transmission system 22 that transmits the YAG pulse laser light generated by both the pulse laser oscillators 10 and 12 respectively to the emission unit 20.

Here, the YAG pulse laser oscillator 10 oscillates/outputs pulse laser light LB of a pulse width-variable (long pulse) YAG fundamental (1064 nm), and the YAG pulse laser oscillator 12 oscillates/outputs pulse laser light SHG of a pulse width-variable (long pulse) YAG second harmonic (532 nm). As described below, the emission unit 20 superposes the YAG fundamental pulse laser light LB and the YAG second harmonic pulse laser light SHG on the same or a common optical axis, focuses the YAG fundamental pulse laser light LB and the YAG second harmonic pulse laser light SHG with a common focusing lens, and irradiates a welding point K on welding pieces ($W_1$ and $W_2$) with the YAG fundamental pulse laser light LB and the YAG second harmonic pulse laser light SHG. The welding pieces ($W_1$ and $W_2$) may comprise optional metals, but the action and effects of the present invention are most remarkably exhibited in the case of Cu metal or Au metal.

Figure 2:
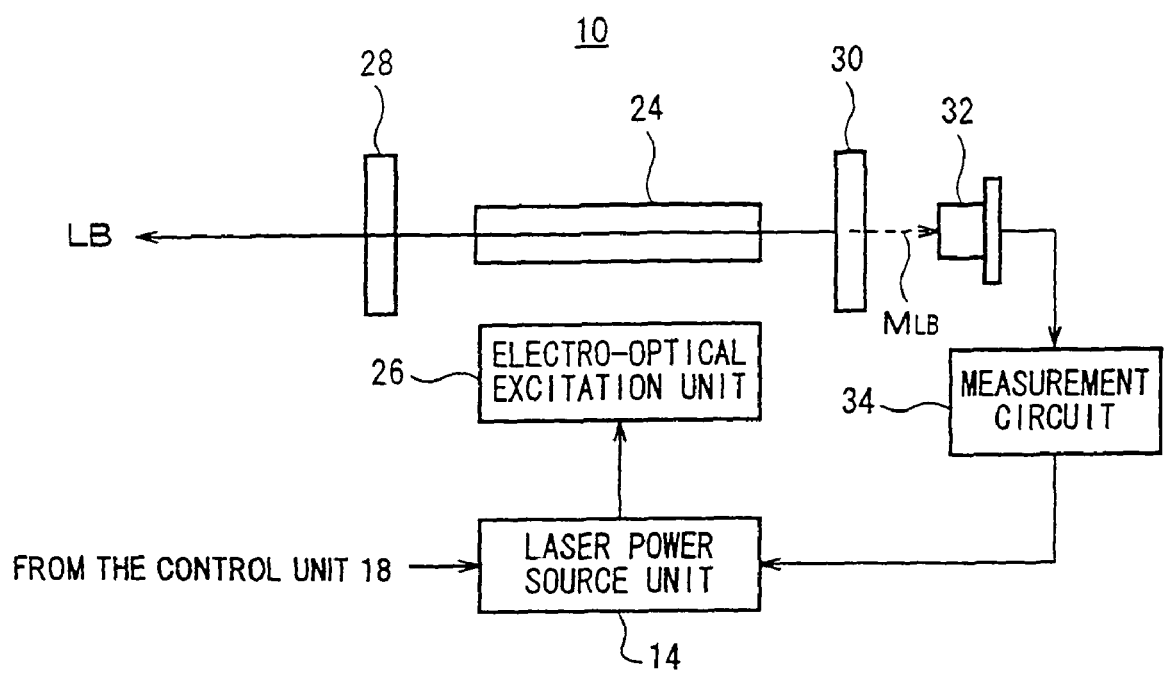
FIG. 2 is a diagram showing the configuration of a YAG fundamental pulse laser oscillator in the embodiment.

FIG. 2 shows a configurational example of the YAG fundamental pulse laser oscillator 10. The laser oscillator 10 is configured by a solid-state laser medium 24 comprising an Nd:YAG rod, for example, an electro-optical excitation unit 26 that irradiates the solid-state laser medium 24 with excitation light, and a pair of optical resonator mirrors 28 and 30 that resonate/amplify the laser light generated from the solid-state laser medium 24 and remove the YAG fundamental (1064 nm) pulse laser light LB. Here, the electro-optical excitation unit 26 comprises an excitation lamp or a laser diode, for example, receives the supply of a pulse waveform excitation current from the laser power source unit 14, lights up, and pumps the solid-state laser medium 24 with the pulse waveform excitation light. Then, the light emerging in the axial direction from both end surfaces of the solid-state laser medium 24 is repeatedly reflected and amplified between the optical resonator mirrors 28 and 30, and removed to the outside of the optical resonator from the output mirror 28 as the YAG fundamental pulse laser light LB. The YAG fundamental pulse laser light LB oscillated/outputted from the laser oscillator 10 is emitted to a later-described first incidence unit 60 (FIG. 1) in the optical fiber transmission system 22.

In this embodiment, a photoelectric conversion element or a photosensor 32 that receives leaking light $M_{LB}$ of the pulse laser light LB leaking to the back of the total reflection mirror 30 is disposed in order to conduct power feedback control in regard to the YAG fundamental pulse laser light LB. A measurement circuit 34 outputs, on the basis of the output signal of the photosensor 32, an electrical signal (laser output measurement value signal) representing the laser output measurement value of the fundamental pulse laser light LB. The laser power source unit 14 compares the laser output measurement value signal from the measurement circuit 34 with a first reference pulse waveform signal from the control unit 18, switches an internal switching element by pulse width modulation (PWM), for example in accordance with the comparison error, controls the pulse excitation current supplied to the electro-optical excitation unit 26, and therefore causes the laser output waveform of the YAG fundamental pulse laser light LB oscillated/outputted from the laser oscillator 10 to imitate the first reference pulse waveform.

Figure 3:
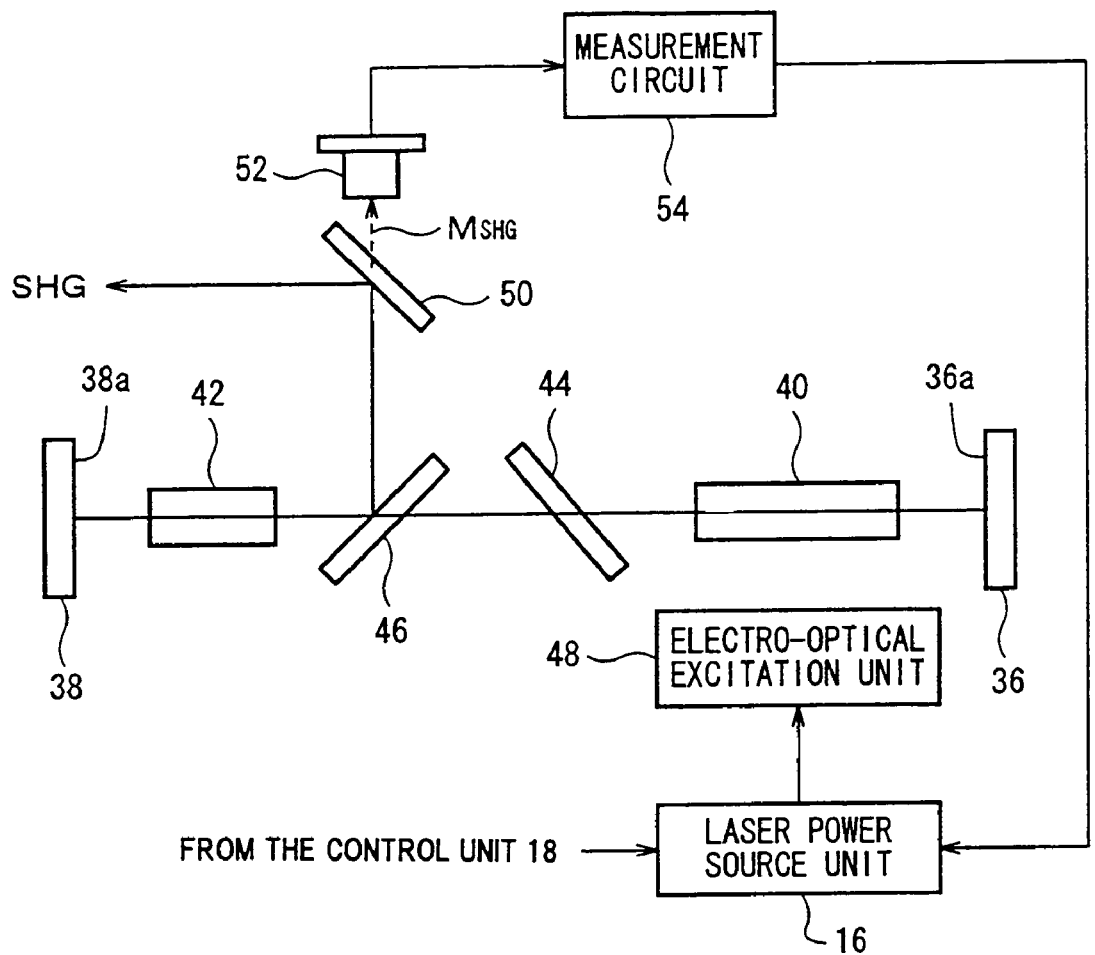
FIG. 3 is a diagram showing a configural example of a YAG second harmonic pulse laser oscillator in the embodiment.

FIG. 3 shows a configurational example of the YAG second harmonic pulse laser oscillator 12. The laser oscillator 12 includes a pair of terminal mirrors 36 and 38, a solid-state laser active medium 40, a wavelength conversion crystal 42, a polarization element 44 and a harmonic-dividing output mirror 46, which are disposed in a row in a linear arrangement. The terminal mirrors 36 and 38 face each other and configure an optical resonator. The terminal mirror 36 includes a reflective surface 36a coated with a film that has a high reflectance with respect to the fundamental wavelength (1064 nm). The terminal mirror 38 includes a reflective surface 38a coated with a film that has a high reflectance with respect to the fundamental wavelength (1064 nm) and a film that has a high reflectance with respect to the second harmonic (532 nm).

The active medium 40 comprises an Nd:YAG rod, for example, is disposed closer to the terminal mirror 36, and is optically pumped by an electro-optical excitation unit 48. The electro-optical excitation unit 48 includes an excitation light source (e.g., an excitation lamp or a laser diode) for generating excitation light towards the active medium 40, causes the excitation light source to be lighted by a pulse waveform excitation current from the laser power source unit 16, and pumps the active medium 40 with the pulse waveform excitation light. The fundamental wavelength pulse beam generated by the active medium 40 is confined and amplified between the terminal mirrors 36 and 38. In this manner, a fundamental pulse laser oscillation unit that generates pulse laser light of the fundamental wavelength (1064 nm) is configured by the terminal mirrors (optical resonator) 36 and 38, the active medium 40 and the electro-optical excitation unit 48.

The polarization element 44 comprises a polarizer or a Brewster plate, for example, and is disposed at a predetermined inclined angle with respect to the optical path or optical axis of the optical resonator so that the fundamental wavelength light beam from the active medium 40 is made incident in a non-normal line direction. P-polarized light of the fundamental wavelength light beam from the active medium 40 is transmitted directly through the polarization element 44 and made incident on the wavelength conversion crystal 42, and S-polarized light is reflected in a predetermined direction by the polarization element 44. Here, the P-polarized light and the S-polarized light are linearly polarized components (electric field components) whose oscillation directions are mutually orthogonal in a plane that is perpendicular to the traveling direction of the fundamental wavelength light beam. For example, the P-polarized light is a linearly polarized component that oscillates in the vertical direction, and the S-polarized light is a linearly polarized component that oscillates in the horizontal direction. Preferably, the polarization filter characteristics are selected so that the P-polarized light transmittance is substantially 100% and the S-polarized light reflectance is substantially 100% with respect to the fundamental wavelength (1064 nm).

The wavelength conversion crystal 42 comprises a nonlinear optical crystal such as a KTP ($KTiOPO_4$) crystal or an LBO ($LiB_3O_5$) crystal, is disposed closer to the terminal mirror 38, is optically coupled with a basic mode excited by the optical resonator, and generates a second harmonic (532 nm) light beam SHG on the optical path of the optical resonator due to the non-linear optical action with the fundamental wavelength.

The second harmonic light beam SHG emitted from the wavelength conversion crystal 42 toward the terminal mirror 38 is returned by the terminal mirror 38 and passes through the wavelength conversion crystal 42. The second harmonic light beam SHG emitted from the wavelength conversion crystal 42 toward the opposite side of the terminal mirror 38 is made incident on the harmonic-dividing output mirror 46 disposed at the predetermined angle (e.g., 45°) with respect to the optical path or optical axis of the optical resonator, and is reflected or divided/outputted in a predetermined direction, i.e., toward a bend mirror 50, by the mirror 46. Then, the optical axis of the second harmonic light beam SHG divided/outputted from the harmonic-dividing output mirror 46 is bent by the bend mirror 50, and the second harmonic light beam SHG is sent to a second incidence unit 66 (FIG. 1) in the optical fiber transmission system 22.

In this embodiment, a photoelectric conversion element or a photosensor 52 that receives leaking light $M_{SHG}$ of the YAG second harmonic pulse laser light SHG leaking to the back of the bend mirror 50 is disposed in order to conduct power feedback control in regard also to the YAG second harmonic pulse laser light SHG. A measurement circuit 54 generates, on the basis of the output signal of the photosensor 52, an electrical signal (laser output measurement value signal) representing the laser output measurement value of the second harmonic pulse laser light SHG. The laser power source unit 16 compares the laser output measurement value signal from the measurement circuit 54 with a second reference pulse waveform signal from the control unit 18, switches a switching element by pulse width modulation (PWM), for example in accordance with the comparison error, controls the pulse excitation current supplied to the electro-optical excitation unit 48, and therefore causes the laser output waveform of the YAG second harmonic pulse laser light SHG oscillated/outputted from the laser oscillator 12 to imitate the second reference pulse waveform.

Figure 4:
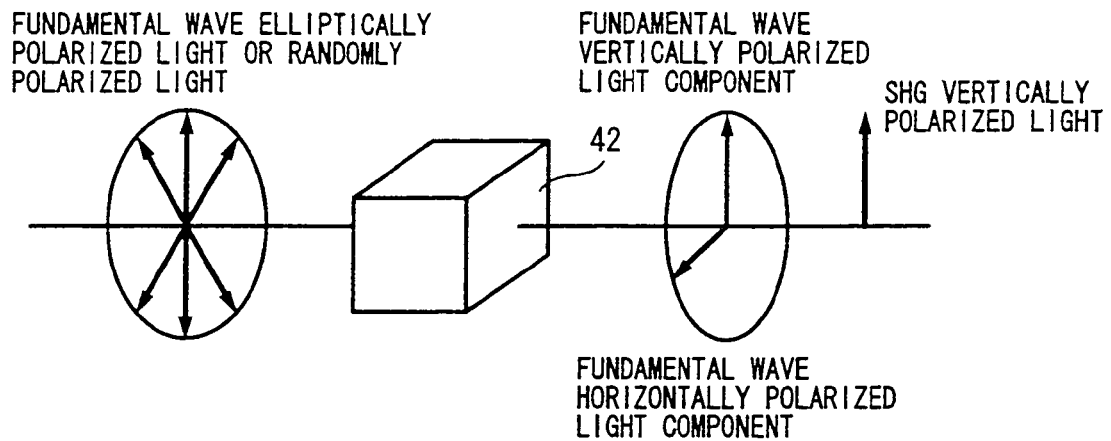
FIG. 4 is a diagram showing basic principle of a wavelength conversion method in the embodiment.

FIG. 4 shows the basic principle of the wavelength conversion method used in this embodiment. The wavelength conversion method uses a nonlinear optical crystal cut at a type II phase-matching angle for the wavelength conversion crystal 42 to convert the wavelength from the fundamental to the second harmonic by type II phase matching. More specifically, the pulse laser light of a fundamental (e.g., 1064 nm) generated by a solid-state laser such as a YAG pulse laser (not shown) is made incident on the nonlinear optical crystal 42 in the form of elliptically polarized light (preferably circularly polarized light) or randomly polarized light. Then, only the vertically polarized component and the horizontally polarized component of the fundamental wavelength of the incident light pass through the nonlinear optical crystal 42 as linearly polarized light. The nonlinear optical crystal 42 is optically coupled with the fundamental YAG pulse laser and generates, by a nonlinear optical effect, the second harmonic pulse laser light SHG (532 nm) of a long pulse linearly polarized in the same direction as the vertically polarized component of the fundamental light.

However, in this wavelength conversion method (FIG. 4), if there is bias or anisotropy in the polarized distribution of the fundamental pulse laser light, sometimes the wavelength conversion efficiency drops, and the laser output of the second harmonic pulse laser light SHG drops or fluctuates. Particularly when the pumping (irradiation of excitation light) of the electro-optical excitation unit 48 with respect to the active medium 40 is uneven, bias or anisotropy occurs in the polarized distribution of the fundamental pulse laser light.

Figure 5:
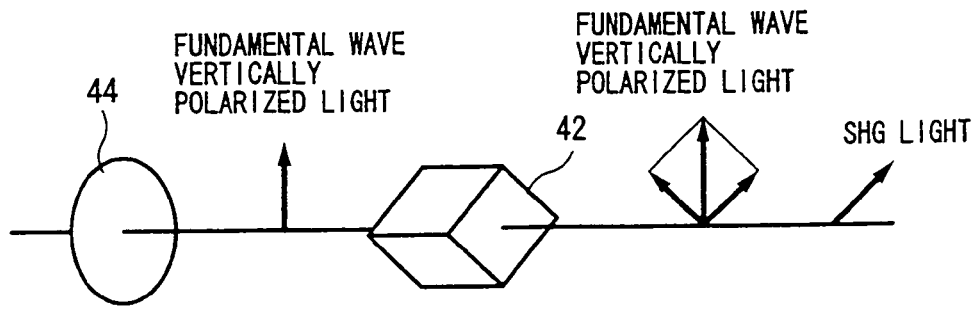
FIG. 5 is a diagram showing the wavelength conversion method in the embodiment.

FIG. 5 shows the wavelength conversion method in this embodiment. In this wavelength conversion, the polarization element 44 that reflects the S-polarized light at the same time as when it transmits the P-polarized light of the fundamental is disposed so that its linearly polarizing direction (oscillation direction of the P-polarized light) is slanted 45° relative to the optical axis of the nonlinear optical crystal 42. In the YAG second harmonic pulse laser oscillator 12 (FIG. 3) of the embodiment, as shown in FIG. 5, the linearly polarizing direction of the polarization element 44 is set in the vertical direction, and the nonlinear optical crystal 42 is disposed so that its optical axis is slanted 45° with respect to the vertical direction.

According to the configuration where the linearly polarizing direction of the polarization element 44 and the optical axis of the nonlinear optical crystal 42 are relatively slanted 45° in this manner, the P-polarized light from the polarization element 44 acts in a nonlinear optical effect as two fundamental light components of equal intensity that are orthogonal when seen in the coordinate system of the nonlinear optical crystal 42. Assuming that the polarization element 44 were omitted, the S-polarized light orthogonal to the P-polarized light would also be made incident on the nonlinear optical crystal 42, whereby the balance between the vertically polarized component and the horizontally polarized component would collapse in the coordinate system of the nonlinear optical crystal 42, and the type II wavelength conversion efficiency would drop. Thus, due to the linear polarization by the polarization element 44, high-efficiency type II wavelength conversion is possible, and the second harmonic pulse laser light SHG of a long pulse can be generated stably and with a high output.

In the optical fiber transmission system 22, the first incidence unit 60 houses a focusing lens 62, and the YAG fundamental pulse laser light LB oscillated/outputted from the YAG fundamental pulse laser oscillator 10 is focused by the focusing lens 62 and made incident on one end surface (incident end surface) of a first optical fiber 64. The second incidence unit 66 also houses a focusing lens 68, and the YAG second harmonic pulse laser light SHG oscillated/outputted from the YAG second harmonic pulse laser oscillator 12 is focused by the focusing lens 68 and made incident on one end surface (incident end surface) of a second optical fiber 70.

The first and second optical fibers 64 and 70 terminate at the emission unit 20. The first optical fiber 64 comprises a step-index (SI) fiber, for example, and transmits the YAG fundamental pulse laser light LB from the first incidence unit 60 to the emission unit 20. The second optical fiber 70 comprises an SI fiber, for example, and transmits the YAG second harmonic pulse laser light SHG from the second incidence unit 66 to the emission unit 20. In this embodiment, the core diameter $ø_1$ of the optical fiber 64 for propagating the fundamental is selected to be a value slightly larger than (preferably 1.3 times to 2 times) the core diameter $ø_2$ of the optical fiber 70 for propagating the second harmonic. Thus, as described later, an improvement (particularly the prevention of humping at edge portions) in the welding quality can be realized.

Figure 6:
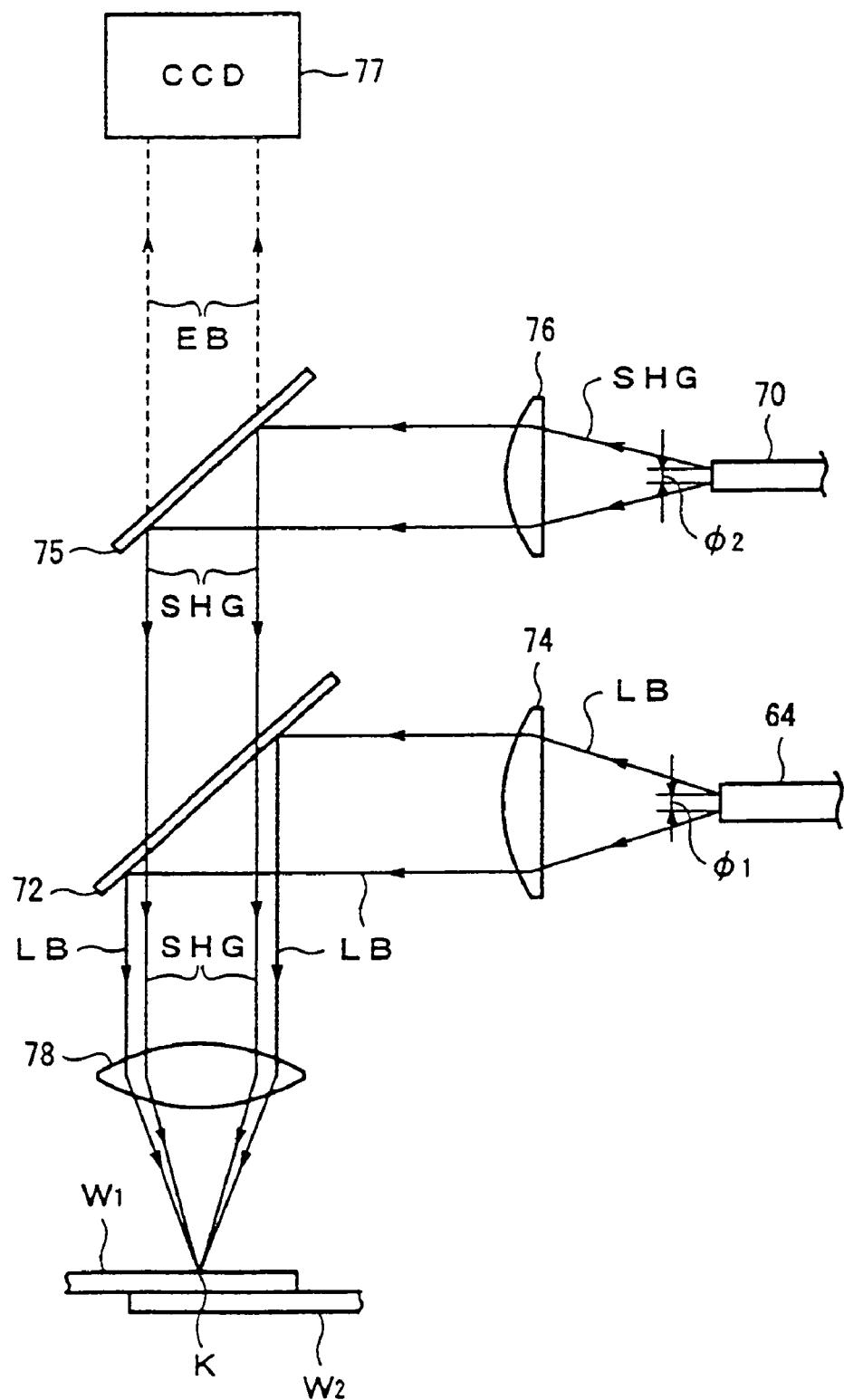
FIG. 6 is a diagram showing the configuration of principal portions of an optical system in an emission unit of the embodiment.

FIG. 6 shows the configuration of relevant portions of an optical system inside the emission unit 20 in this embodiment.

As shown in FIG. 6, dichroic mirrors 72 and 75 are disposed at an inclination of 45° with respect to a vertical axis (axis in the longitudinal direction of the unit) in the center portion inside the emission unit 20. The first optical fiber 64 terminates at a lower end portion side of the emission unit 20, and the terminal end surface (i.e., emission end surface) of the first optical fiber 64 faces the undersurface of the dichroic mirror 72 vertically downward. The second optical fiber 70 terminates at an upper end portion side of the emission unit 20, and the terminal end surface (i.e., emission end surface) of the second optical fiber 70 faces the undersurface of the dichroic mirror 75 horizontally inward. A first collimator lens 74 is disposed between the emission end surface of the first optical fiber 64 and the dichroic mirror 72, and a second collimator lens 76 is disposed between the emission end surface of the second optical fiber 70 and the dichroic mirror 75. A focusing lens 78 is disposed directly below the dichroic mirror 72. The dichroic mirror 72 uses a transparent substrate as its mother material, and the substrate is coated with a film that is reflective with respect to the fundamental wavelength (1064 nm) and a film that is transmissive with respect to the second harmonic (532 nm) and visible light. The dichroic mirror 75 uses a transparent substrate as its mother material, and the substrate is coated with a film that is reflective with respect to the second harmonic (532 nm) and a film that is transmissive with respect to visible light.

The YAG fundamental pulse laser light LB radially emitted in the horizontal direction from the emission end surface of the first optical fiber 64 is collimated by the first collimator lens 74, reflected at a right angle vertically downward by the dichroic mirror 72, and made incident on the focusing lens 78. The YAG second harmonic pulse laser light SHG radially emitted in the horizontal direction from the emission end surface of the second optical fiber 70 is collimated by the second collimator lens 76, reflected at a right angle vertically downward by the dichroic mirror 75, transmitted through the dichroic mirror 72, and made incident on the focusing lens 78. The fundamental light beam LB reflected vertically downward by the dichroic mirror 72 and the second harmonic light beam SHG reflected vertically downward by the dichroic mirror 75 and transmitted through the dichroic mirror 72 are superposed on substantially the same optical axis and focused by the focusing lens 78 in their superposed state. The emission unit 20 can also be configured so that the distance between the emission end surfaces of the optical fibers 64 and 70 and the collimator lenses 74 and 76 can be variably adjusted for focal point adjustment.

A monitor-use CCD camera 77 is attached to the upper end portion of the emission unit 20. Visible light entering the emission unit 20 from the processing point K of the welding pieces is transmitted through the dichroic mirrors 72 and 75 and received by an imaging element in the CCD camera 77.

In this embodiment, as described above, the core diameter $ø_1$ of the optical fiber 64 of the YAG fundamental system is selected to be a value slightly larger than (preferably 1.3 times to 2 times) the core diameter $ø_2$ of the optical fiber 70 for propagating the second harmonic, and the image formation ratio of the YAG fundamental to the YAG second harmonic is selected to be 1:1 inside the emission unit 20. Thus, the welding point K on the welding pieces ($W_1$ and $W_2$) is irradiated by a beam spot or irradiation diameter where the YAG fundamental pulse laser light LB is slightly larger than (1.3 times to 2 times) the YAG second harmonic pulse laser light SHG.

In regard to the method of superposing the YAG second harmonic pulse laser light SHG and the YAG fundamental pulse laser light LB inside the emission unit 20, ordinarily the power of the LB is significantly greater than the power of the SHG. Thus, as shown in FIG. 6, it is preferable for the two to be superposed so that the LB is on the top and the SHG is on the bottom. However, it is also possible to conversely superpose the two so that the SHG is on the top and the LB is on the bottom, and the positions of the emission end portions of the first and second optical fibers 64 and 70 and the position of the CCD camera 77 can be optionally selected inside the emission unit 70.

The control unit 18 controls the laser oscillation operation of the YAG fundamental pulse laser oscillator 10 and the YAG second harmonic pulse laser oscillator 12 through the laser power source units 14 and 16, and in particular provides the first and second reference pulse waveform signals, which individually define the laser output waveforms of the YAG fundamental pulse laser light LB and the YAG second harmonic pulse laser light SHG, to the laser power source units 14 and 16 at a predetermined timing.

Figure 7:
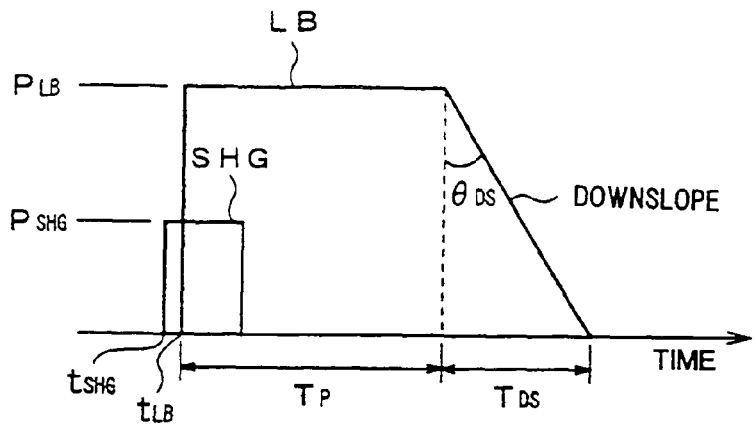
FIG. 7 is a waveform diagram showing typical laser output waveforms of YAG fundamental pulse laser light and YAG second harmonic pulse laser light of the embodiment.

FIG. 7 shows typical laser output waveforms of the YAG fundamental pulse laser light LB and the YAG second harmonic pulse laser light SHG in this embodiment. The laser output waveforms of the pulse laser light LB and the pulse laser light SHG respectively correspond to the first and second reference pulse waveforms provided from the control unit 18. As shown in FIG. 7, one of the features of this embodiment is that there is a slight time difference between the rise of the pulse laser light LB and the rise of the pulse laser light SHG; in other words, the rise of the YAG second harmonic pulse laser light SHG is slightly earlier than the rise of the YAG fundamental pulse laser light LB.

Figure 8:
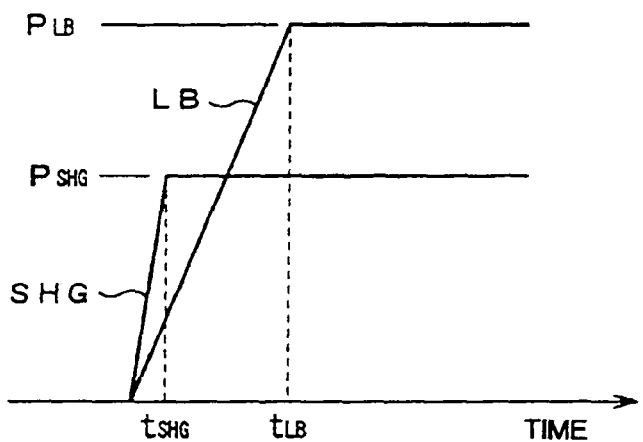
FIG. 8 is an enlarged waveform diagram showing the rises of the pulse laser light in the embodiment.
Figure 9:
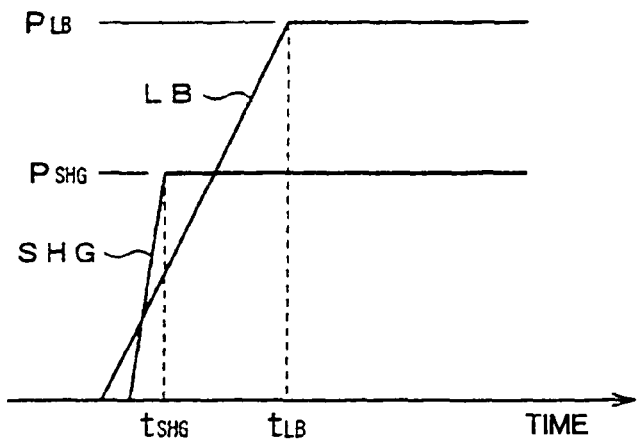
FIG. 9 is a enlarged waveform diagram showing a modified example of the rises of the pulse laser light in the embodiment.

More specifically, as shown in FIG. 8, it is important for the point in time $t_{SHG}$ at which the laser output of the YAG second harmonic pulse laser light SHG reaches a set peak $P_{SHG}$ to be slightly (preferably 0.05 ms to 0.3 ms) earlier than the point in time $t_{LB}$ at which the laser output of the YAG fundamental pulse laser light LB reaches a set peak $P_{LB}$. In this sense, the before-or-after relationship between the starts of the rises may be optional. For example, as shown in FIG. 9, the start of the rise of the LB may also be earlier than the start of the rise of the SHG.

Figure 10:
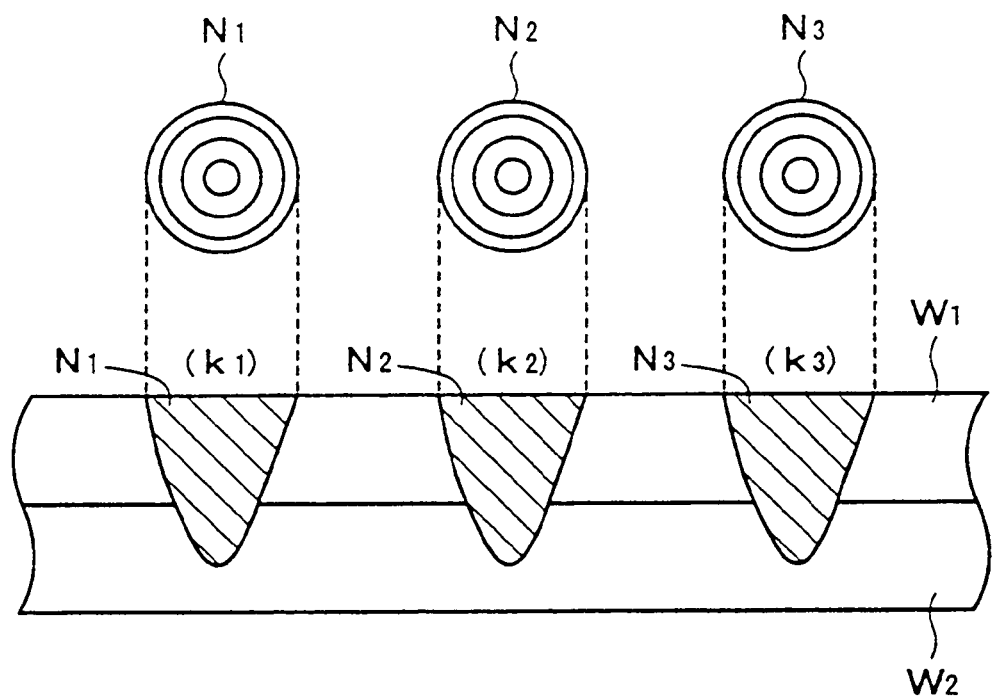
FIG. 10 is a plan view and a cross-sectional view schematically showing welding nuggets obtained in the embodiment.

In this manner, the laser output of the YAG second harmonic pulse laser light SHG reaches its peak $P_{SHG}$ earlier than the laser output of the YAG fundamental pulse laser light LB reaches its peak $P_{LB}$, whereby keyhole formation is smoothly started (triggered) in the vicinity of the welding point K, and hereupon the laser output of the YAG fundamental pulse laser light LB reaches the peak $P_{LB}$, whereby the keyhole expands/grows inward due to the superposition or multiplier effect of both of the pulse laser light LB and the pulse laser light SHG, and constantly deep penetration with good reproducibility or welding nuggets $N_1$, $N_2$, $N_3$, etc. are obtained at different welding points $K_1$, $K_2$, $K_3$, etc., as schematically shown in FIG. 10. Actually, in the present embodiment, a stable welding result with high reproducibility in a copper plate with a plate thickness of 0.3 mm or more has been confirmed. When copper or gold is melted, it absorbs the YAG fundamental well. Thus, the irradiation time (pulse width) of the YAG second harmonic pulse laser light SHG may be shorter than the irradiation time (pulse width) of the YAG fundamental pulse laser light LB (there is no influence on the welding quality).

Figure 11:
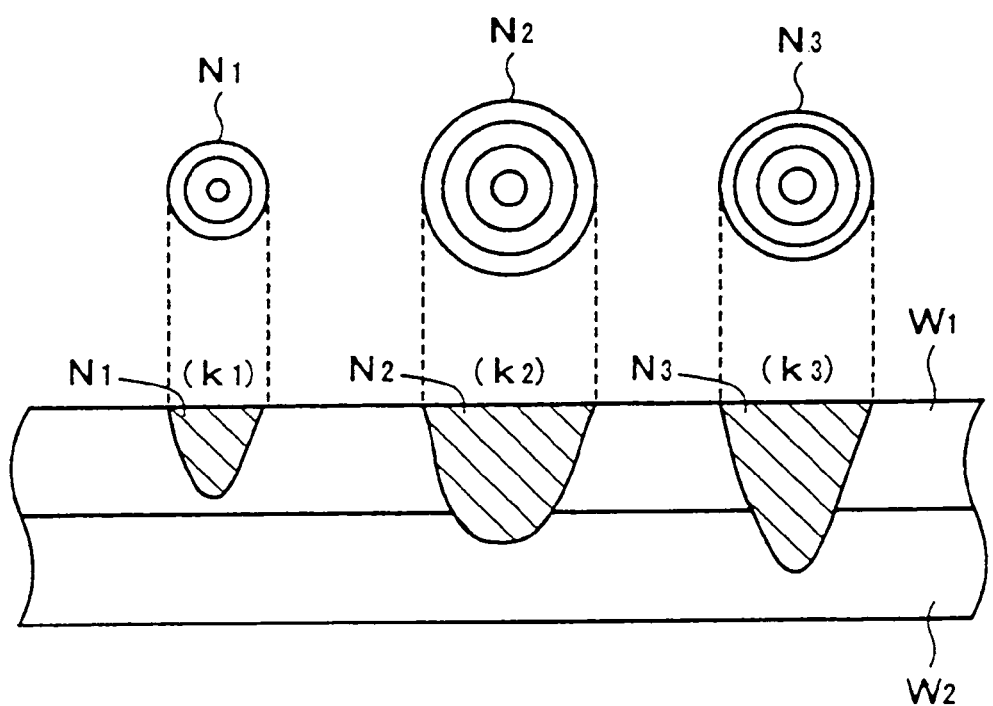
FIG. 11 is a plan view and a cross-sectional view schematically showing welding nuggets obtained in a comparative example.

In contrast to the present embodiment, when the before-or-after relationship between the points in time $t_{LB}$ and $t_{SHG}$ at which the pulse laser light LB and the pulse laser light SHG reach their peaks is the opposite (i.e., when $t_{LB}$ comes before $t_{SHG}$), variations arise in the welding nuggets $N_1$, $N_2$, $N_3$, etc., as schematically shown in FIG. 11. This is because when the laser output of the YAG fundamental pulse laser light LB reaches its peak $P_{LS}$ before the laser output of the YAG second harmonic pulse laser light SHG reaches its peak $P_{SHG}$, the start of keyhole formation by the YAG second harmonic is disturbed by its superposition with the YAG fundamental, and the expansion/growth of the keyhole and penetration are unstable.

Another feature of this embodiment is that the fall of the laser output of the YAG fundamental pulse laser light LB is controlled to a downslope waveform, as shown in FIG. 7. Due to this downslope control, disturbances in the outer appearance of the welding nuggets $N_1$, $N_2$, $N_3$, etc., and particularly humping (knobs) at the center portions, can be effectively prevented.

Figure 12:
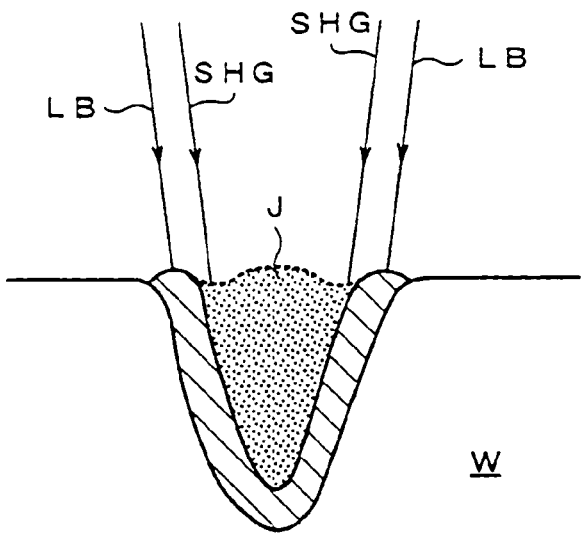
FIG. 12 is a cross-sectional view for describing the basic principle of laser welding in the embodiment.
Figure 13:
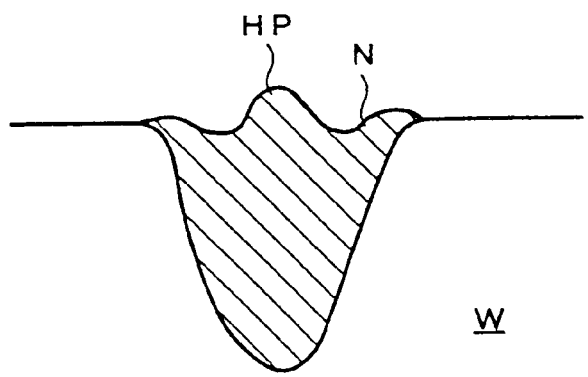
FIG. 13 is a cross-sectional view schematically showing the welding nugget obtained in the comparative example.

Namely, during irradiation with the laser beam LB, as shown in FIG. 12, metal vapor J arises inside the keyhole formed in the vicinity of the welding point, the metal melts around the keyhole, and the laser beam is repeatedly absorbed and reflected by the side wall of the keyhole. Then, when the irradiation with the laser beam LB stops, the melted material flows into the hole and solidifies. At this time, when the irradiation with the laser beam LB is suddenly stopped, the melted material quickly gathers in the center portion and solidifies as it is. Thus, as schematically shown in FIG. 13, it is easy for a knob-like humping HP to form in the center portion of the surface of the nugget N.

Figure 14:
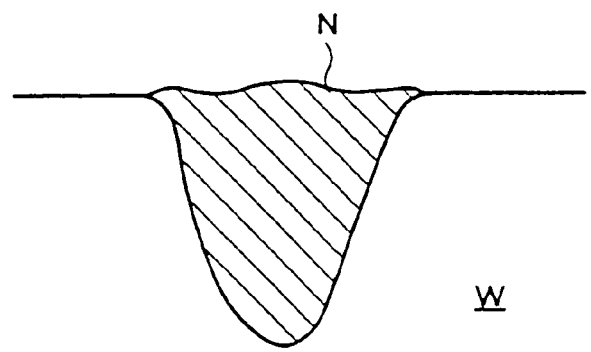
FIG. 14 is a cross-sectional view schematically showing the welding nugget obtained in the embodiment.

According to the downslope control of this embodiment, the irradiation energy of the laser beam LB is gradually reduced, whereby the melted material gradually spreads inside the keyhole, and a nugget surface (welded exterior) without humping is obtained, as schematically shown in FIG. 14. The slope angle $\theta_{DS}$ or slope time $T_{DS}$ of the downslope according to the present invention may be appropriately set in accordance with the welding specifications, but with respect to welding an ordinary copper thick plate, it is preferable to select the slope time $T_{DS}$ to be within the range of 20% to 50% with respect to the duration $T_P$ of the peak of the YAG fundamental pulse laser light LB.

Figure 15:
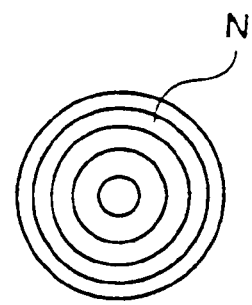
FIG. 15 is a plan view schematically showing the outer appearance of the welding nugget obtained in the embodiment.

One of the features in this embodiment, as mentioned in the above, is also to select the core diameter $\varnothing_1$ of the optical fiber 64 for propagating the fundamental to be a value slightly larger than (preferably 1.3 times to 2 times) the core diameter $\varnothing_2$ of the optical fiber 70 for propagating the second harmonic. Namely, by making the irradiation diameter of the YAG fundamental pulse laser light LB slightly larger than the irradiation diameter of the YAG second harmonic pulse laser light SHG, the ratio of the keyhole diameter to the nugget diameter can be reduced, the melted portion around the keyhole can be stabilized, and as schematically shown in FIG. 15, the nugget (particularly the edge portions) after solidification can be made into a smooth surface.

Figure 16:
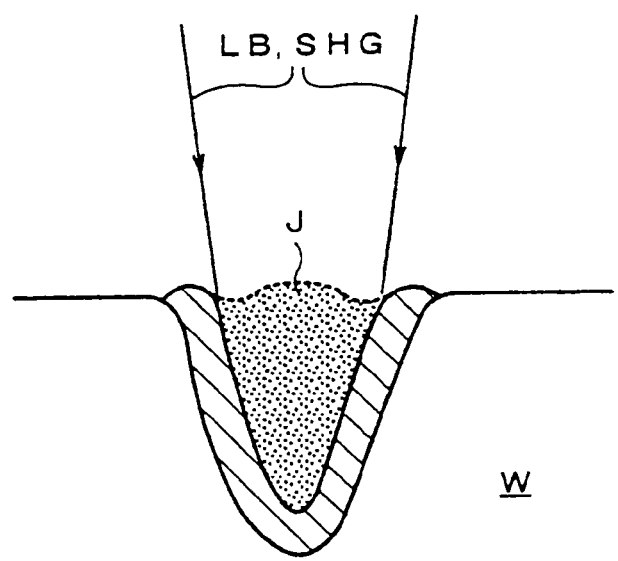
FIG. 16 is a cross-sectional view for describing the action of a laser welding method in the comparative example.
Figure 17:
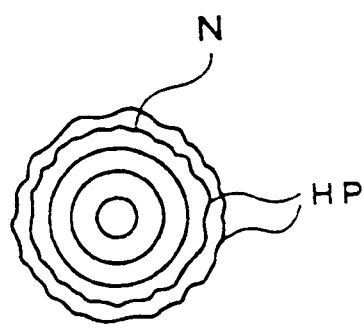
FIG. 17 is a plan view schematically showing the outer appearance of the welding nugget obtained in the comparative example.

In contrast to the present embodiment, when the core diameters $\varnothing_1$ and $\varnothing_2$ of the optical fibers 64 and 70 are made the same and the irradiation diameters of the pulse laser light LB and the pulse laser light SHG are made the same as shown in FIG. 16, the ratio of the keyhole diameter to the nugget diameter is large. Thus, the influence of the metal vaporized portion is strongly received, the melted portion of the periphery becomes unstable, and as schematically shown in FIG. 17, the nugget surface (particularly the edge portions) after solidification becomes easily disturbed, and humping HP easily occurs in the edge portions.

A preferred embodiment has been described above, but the present invention is in no way limited to this embodiment and can be variously modified within the range of its technical ideas. For example, in the above embodiment, the first and second reference pulse waveform signals defining the laser output waveforms of the YAG fundamental pulse laser light LB and the YAG second harmonic pulse laser light SHG were generated by the control unit 18 and transmitted to the laser power source units 14 and 16. However, the control unit 18 may also be configured to generate only timing signals or startup signals, and the reference pulse waveform signals may be generated inside the laser power source units 14 and 16.

Also, in the above embodiment, the second harmonic (532 nm) was used as the YAG harmonic, but the third harmonic (355 nm) or the fourth harmonic (266 nm), etc. may also be used. Also, as the solid-state medium 24 or active medium 40 for generating the YAG harmonic, an Nd:YLF crystal, an Nd:YVO$_4$ crystal, or a Yb:YAG crystal, etc. can also be used in addition to the Nd:YAG crystal. The laser welding method of the present invention is applicable to various joint forms, such as lap joints, butt joints, and fillet joints.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A laser welding method of superposing, and irradiating a welding zone with, a YAG fundamental long pulse laser light beam having a variable pulse width and a YAG harmonic long pulse laser light beam having a variable pulse width, to thereby weld the welding zone with the energy of both the YAG fundamental long pulse laser light beam and the YAG harmonic long pulse laser light beam, the method comprising:

superposing both long pulse laser lights-light beams at such a time difference that the laser output of the YAG harmonic long pulse laser light beam reaches its peak before the laser output of the YAG fundamental long pulse laser light beam reaches its peak.

2. The laser welding method of claim 1, wherein the time difference is selected to be within the range of 0.05 ms to 0.3 ms.

3. The laser welding method of claim 1, wherein the fall of the YAG fundamental long pulse laser light beam is controlled to a downslope waveform.

4. The laser welding method of claim 3, wherein the fall time of the YAG fundamental long pulse laser light beam is selected to be within the range of 20% to 50% with respect to the duration of the peak of the YAG fundamental long pulse laser light beam.

5. The laser welding method of claim 1, wherein the YAG fundamental long pulse laser light beam and the YAG harmonic long pulse laser light beam are transmitted to a laser emission unit through first and second optical fibers, respectively, and the YAG fundamental long pulse laser light beam and the YAG harmonic long pulse laser light beam respectively emitted from terminal end surfaces of the first and second optical fibers are superposed on the same axis inside the laser emission unit.

6. The laser welding method of claim 5, wherein the core diameter of the first optical fiber is larger than the core diameter of the second optical fiber.

7. The laser welding method of claim 6, wherein the core diameter of the first optical fiber is selected to be 1.3 times to 2 times the core diameter of the second optical fiber.

8. The laser welding method of claim 1, wherein the welding pieces comprise Cu metal or Au metal.

* * * * *